United States Patent
Shibusawa (10) Patent No.: US 7,206,032 B2
(45) Date of Patent: Apr. 17, 2007

(54) DIGITAL BROADCASTING RECEIVER

(75) Inventor: Toru Shibusawa, Osaka (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 489 days.

(21) Appl. No.: 10/721,899

(22) Filed: Nov. 26, 2003

(65) Prior Publication Data

US 2004/0105031 A1 Jun. 3, 2004

(30) Foreign Application Priority Data

Dec. 3, 2002 (JP) .............................. 2002/351286

(51) Int. Cl.
*H04N 5/50* (2006.01)
(52) U.S. Cl. ...................... 348/732; 348/731
(58) Field of Classification Search ......... 348/731–733
See application file for complete search history.

(56) References Cited

U.S. PATENT DOCUMENTS

| | | | | |
|---|---|---|---|---|
| 6,744,477 | B2 * | 6/2004 | Meersseman | 348/731 |
| 6,985,190 | B1 * | 1/2006 | Klopfenstein et al. | 348/569 |
| 2002/0051092 | A1 * | 5/2002 | Kim | 348/731 |

FOREIGN PATENT DOCUMENTS

| | | |
|---|---|---|
| JP | 06-233204 | 8/1994 |
| JP | 2000-332633 A | 11/2000 |
| JP | 2002-064759 A | 2/2002 |
| JP | 2002-171453 A1 | 6/2002 |
| JP | 2002-232801 A | 8/2002 |

OTHER PUBLICATIONS

Office Action dated Nov. 1, 2005 issued in corresponding Japanese Application No. 2002-351286, filed Dec. 3, 2002.
Office Action from the Japanese Patent Office dated Jan. 30, 2007 in the corresponding Japanese Patent Application No. 2002-351286.

\* cited by examiner

*Primary Examiner*—Michael H. Lee
(74) *Attorney, Agent, or Firm*—Westerman, Hattori, Daniels & Adrian, LLP.

(57) ABSTRACT

A CPU stores, when there is a difference between current channel information and new channel information obtained by a new channel search, the new channel information in a memory while holding a state where the current channel information is registered (contents stored in a non-volatile memory). The CPU displays on a screen the channel information between which the difference is presented using an OSD circuit, and changes the contents of the registration of the current channel information on the basis of the new channel information by a user operation on the screen.

11 Claims, 6 Drawing Sheets

| BANK 1 | | | | | | | BANK 2 | | | | | | | BANK 3 | | | | | | |
|---|---|---|---|---|---|---|---|---|---|---|---|---|---|---|---|---|---|---|---|---|
| SEARCH DATE | | | 03/08/08 | | | | SEARCH DATE | | | 03/11/20 | | | | SEARCH DATE | | | 03/12/12 | | | |
| CHANNEL NUMBER | NETWORK | AREA NAME | FREQUENCY | REMOTE CONTROL NUMBER | RECEIVING SIGNAL QUALITY | JUDGEMENT | CHANNEL NUMBER | NETWORK | AREA NAME | FREQUENCY | REMOTE CONTROL NUMBER | RECEIVING SIGNAL QUALITY | JUDGEMENT | CHANNEL NUMBER | NETWORK | AREA NAME | FREQUENCY | REMOTE CONTROL NUMBER | RECEIVING SIGNAL QUALITY | JUDGEMENT |
| 14 | ○○ BROADCASTING | New York | 473 | 12 | 80 | ◎ | 14 | ○○ BROADCASTING | New York | 473 | 12 | 63 | ○ | 14 | ○○ BROADCASTING | New York | 473 | 12 | 63 | ○ |
| 18 | YY-TV | New York | 497 | 10 | 64 | ○ | 15 | MM BROADCASTING | New York | 479 | 4 | 78 | ○ | 15 | MM BROADCASTING | New York | 479 | 4 | 80 | ◎ |
| 24 | ■■ BROADCASTING | New York | 539 | 2 | 70 | ○ | 16 | AA BROADCASTING | New York | 485 | 6 | 68 | ○ | 16 | AA BROADCASTING | New York | 485 | 6 | 68 | ○ |
| | | | | | | | 17 | XX-TV | New York | 491 | 8 | 75 | ○ | 17 | XX-TV | New York | 491 | 8 | 75 | ○ |
| | | | | | | | 18 | YY-TV | New York | 497 | 10 | 82 | ◎ | 18 | △△-TV | New York | 497 | 10 | 82 | ◎ |
| | | | | | | | 24 | ■■ BROADCASTING | New York | 539 | 2 | 90 | ◎ | 19 | TV-○○■■ | New York | 503 | 9 | 64 | ○ |
| | | | | | | | | | | | | | | 24 | ■■ BROADCASTING | New York | 539 | 2 | 90 | ◎ |
| | | | | | | | | | | | | | | 20 | TV-WW | Cleveland | 515 | 11 | 52 | △ |
| | | | | | | | | | | | | | | 22 | ss-TV | Baltimore | 527 | 3 | 56 | △ |
| | | | | | | | | | | | | | | 26 | ■■ BROADCASTING | Philadelphia | 533 | 1 | 43 | △ |

Fig. 3

AREA CODE: 574-0000

| CHANNEL NUMBER | NETWORK | AREA NAME | FREQUENCY | REMOTE CONTROL NUMBER | RESULTS OF LAST SCANNING (REGISTERED) RECEIVING SIGNAL QUALITY | JUDGEMENT | RESULTS OF CURRENT SCANNING RECEIVING SIGNAL QUALITY | JUDGEMENT | REGISTER CHANGE BUTTON | |
|---|---|---|---|---|---|---|---|---|---|---|
| 14 | ○○ BROADCASTING | New York | 473 | 12 | 63 | ○ | — | — | REGISTER | SELECT EITHER ONE OF THEM |
| 14 | ○○ BROADCASTING | Boston | 473 | UNALLOCATED | — | — | 77 | ○ | REGISTER | |
| 15 | MM BROADCASTING | New York | 479 | 4 | 80 | ◎ | 82 | ◎ | (DELETABLE) | |
| 16 | AA BROADCASTING | New York | 485 | 6 | 68 | ○ | 59 | △ | (DELETABLE) | ANTENNA ADJUSTMENT REQUIRED |
| 17 | XX-TV | New York | 491 | 8 | 75 | ○ | 79 | ○ | (DELETABLE) | |
| 18 | △△-TV | New York | 497 | 10 | 82 | ◎ | 84 | ◎ | (DELETABLE) | ANTENNA ADJUSTMENT REQUIRED |
| 19 | TV-◎◎ | New York | 503 | 9 | 64 | ○ | — | — | DELETE | |
| 24 | ■ BROADCASTING | New York | 539 | 2 | 90 | ◎ | 92 | ◎ | (DELETABLE) | ANTENNA ADJUSTMENT REQUIRED |
| 20 | TV-WW | Cleveland | 515 | 11 | 52 | △ | 38 | × | (DELETABLE) | |
| 22 | SS-TV | Baltimore | 527 | 3 | 56 | △ | 62 | ○ | (DELETABLE) | |
| 26 | ■ BROADCASTING | Philadelphia | 533 | 1 | 43 | △ | — | — | REGISTER | SELECT EITHER ONE OF THEM |
| 26 | ▽▽-TV | New Heaven | 533 | UNALLOCATED | — | — | 66 | ○ | BLOCK-REGISTER | |

If the following buttons are pressed ...
REGISTER : A channel is newly added and registered.
DELETE : If a block-registering operation is performed, deletion is made.
(DELETABLE) : Deletion can be made from a channel map.
BLOCK-REGISTER : Results of last scanning are cancelled,
and results of current scanning are block-registered.
(When there are a plurality of networks on the same channel, the one
satisfying better receiving conditions is automatically selected.)

SUSPEND: Search results are temporarily suspended.
RE-SEARCH: Please make re-search after antenna adjustment.

SUSPEND

RE-SEARCH

DIGITAL BROADCASTING RECEIVER

BACKGROUND OF THE INVENTION

FIELD OF THE INVENTION

The present invention relates to a digital broadcasting receiver that receives digital broadcasting.

A digital broadcasting receiver that receives digital broadcasting using a satellite or a terrestrial wave selects any of a plurality of broadcasting waves received through a dedicated antenna or a terrestrial wave antenna using a tuner, selects any of a plurality of channels included in the selected broadcasting wave using demultiplex processing, extracts a digital signal on the selected channel, and decodes the extracted digital signal, to output a video/audio signal.

Particularly in a receiver that receives terrestrial digital broadcasting, it is desired that an initial channel search is made as initial setting when the receiver is installed, to acquire existent station channel information. Even after the initial setting, it is desired that an automatic channel search is frequently made utilizing the time of non-viewing such as stand-by time in order to cope with opening of a new broadcasting station, installation of a new relay center, or the change in a broadcasting frequency, for example.

An example of a conventional broadcasting receiver that makes a channel search is one that makes a channel search in two CPUs which are respectively in charge of analog broadcasting and digital broadcasting in parallel (see JP-A-2002-171453).

When it is assumed that new channel information obtained by making an automatic channel search, as described above, is used as it is in place of current channel information, the channel may be taken as one on which there is no station, although it is one on which there is a station, by only one non-existent station judgment made in a time period during which waves are stopped, for example, at midnight. In order to avoid this, when it is assumed that processing for only adding a channel which is newly judged to be a channel on which there is a station to the current existent station channel information and storing the added channel is performed, for example, a channel of a closed station, or the like is not deleted from the current channel information, so that the channel of the closed station is tuned in to when an operation such as a channel up/down operation is performed by a user.

SUMMARY OF THE INVENTION

In view of the foregoing circumstances, an object of the present invention is to provide a digital broadcasting receiver that can reflect a user's validity judgment and a user's desire to update channel information.

In order to solve the above-mentioned problem, a digital broadcasting receiver according to the present invention is characterized by comprising means for storing, when there is a difference between current channel information and new channel information by a new channel search, the new channel information while holding a state where the current channel information is registered; means for displaying on a screen the channel information between which the difference is presented; and means for allowing the contents of the registration of the current channel information to be changed on the basis of the new channel information by a user operation on the screen.

In the above-mentioned configuration, the contents of the registration of the current channel information can be changed on the basis of the new channel information by the user operation on the screen on which the channel information between which the difference is presented is displayed. Accordingly, the new channel information can be registered by reflecting a user's judgment (judgment as to the validity of change) and a user's desire.

The digital broadcasting receiver may be so configured that the registration of the channel information is changed for each channel by the user operation. Further, the digital broadcasting receiver may be so configured that in a case where network IDs which are on the same physical channel and differ from one another in the current contents of the registration are detected by the channel search, the channel information for each of the network IDs is presented, and either one of the channel information is registered on the basis of a user's instruction.

The digital broadcasting receiver may be so configured that block registration based on new existent station channel information is performed by the user operation. Further, the digital broadcasting receiver may be so configured that in a case where a plurality of network IDs which are on the same channel and differ from one another are detected by a channel search, a network of the best receiving quality out of the network IDs is automatically registered in the block registration, or the channels having the network IDs directed to the same area as an area where the receiver is installed are automatically registered in the block registration.

In the configurations, the digital broadcasting receiver may be so configured that display for urging, when there is a difference between new channel information obtained by a channel search at the time of a stand-by state and current channel information, a registering operation to be performed by screen display at the time of releasing the stand-by state. Further, the digital broadcasting receiver may be so configured that in a case where an instruction signifying that no registering operation is performed is issued, display for urging a registering operation to be performed by screen display at the next time of releasing the stand-by state. Further, the digital broadcasting receiver may be so configured that the execution of re-search for a channel is suspended while no registering operation is performed.

In the above-mentioned configurations, the digital broadcasting receiver may be so configured that information related to the receiving signal quality is held in correspondence with each of the channel information, and display for indicating the receiving signal quality is performed, when the channel information between which the difference is presented are displayed on the screen, in correspondence with the corresponding channel. Further, the digital broadcasting receiver may be so configured that information related to the receiving signal quality is held in correspondence with each of the channel information, and display for urging an antenna to be adjusted is performed on a screen on which the channel information between which the difference is presented is displayed in correspondence with the corresponding channel when the receiving signal quality is close to its receiving limit.

In the above-mentioned configurations, the digital broadcasting receiver may be so configured that the registered channel information is erased when a code indicating the area where the receiver is installed is set again. Further, the digital broadcasting receiver may comprise means for storing the past registered channel information, and means for selecting the past registered channel information in place of the current registered channel information by a user operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 are flow charts for explaining channel search processing, existent station channel information updating processing, and so on.

DESCRIPTION OF THE PREFERRED EMBODIMENTS

An embodiment of the present invention will be described on the basis of FIGS. 1 to 6. Here, a case where a user views terrestrial digital broadcasting is illustrated.

Figure 1:
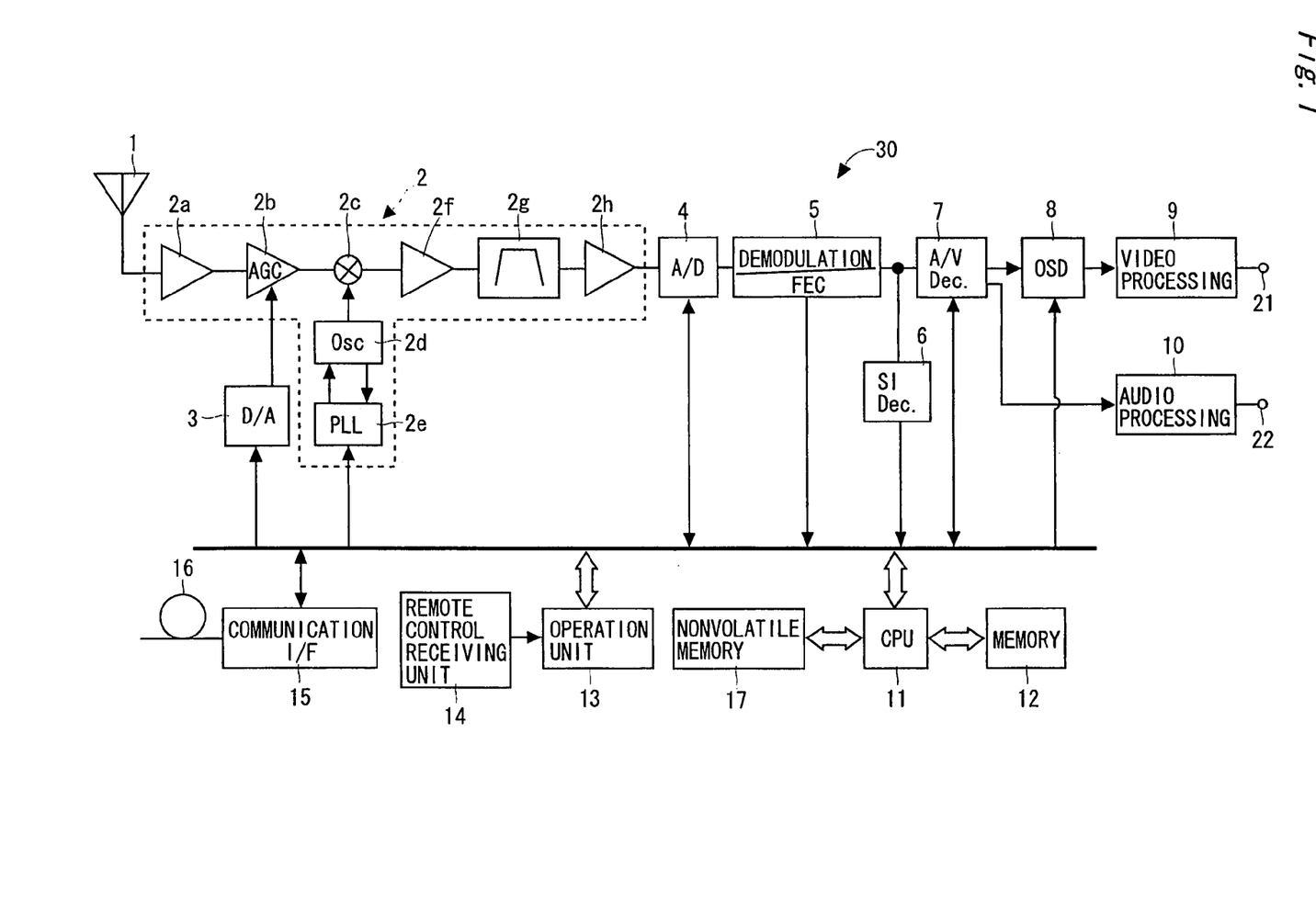
FIG. 1 is a block diagram showing a digital broadcasting receiver 30 according to the present embodiment.

In FIG. 1, an antenna 1 is arranged in a predetermined direction outdoors, and receives a digital broadcasting wave fed from a terrestrial broadcasting station and feeds its receiving signal to a tuner 2.

The tuner 2 tunes in to an RF (high-frequency signal) from the antenna 1 and converts the RF tuned in to into an intermediate frequency (IF). The tuner 2 comprises a first-stage amplifier 2a for amplifying the received RF signal, an AGC (Automatic Gain Control) amplifier 2b for making gain variable by a control voltage from the exterior, a mixer 2c for generating an IF signal which is a difference between a local frequency generated by a voltage controlled oscillator 2d and the received RF signal, a PLL (Phase Locked Loop) circuit 2e for controlling the voltage controlled oscillator 2d to a predetermined state where a fixed frequency is outputted by data representing channel selection fed from the CPU 11, intermediate frequency amplifiers 2f and 2h, a band-pass filter 2g for extracting the IF signal, and so on.

AD/A (Digital-to-Analog) converter 3 generates again control voltage of the AGC amplifier 2b on the basis of the data fed from the CPU 11.

An A/D (Analog-to-Digital) converter 4 converts the IF signal outputted from the tuner 2 into digital data. A demodulation/FEC (Forward Error Correction) circuit 5 demodulates the received signal which has been converted into digital data and performs error correction processing. An MPEG decoder 7 converts a transport stream in an MPEG2 (Moving Picture Experts Group2) format which has been demodulated by the demodulation/FEC circuit 5 into video data and audio data.

An OSD circuit 8 synthesizes characters and graphics data with the video data on the basis of the data fed from the CPU 11. A video processing circuit 9 converts the video data into a base band video signal, and comprises a D/A converter and a line driver. An audio processing circuit 10 converts the audio data into a base band audio signal, and comprises a D/A converter and a buffer amplifier. A video input terminal of an external monitor 31 (not shown) (see FIG. 2) is connected to a base band video signal output terminal 21. A base band audio signal output terminal 22 is connected to an audio input terminal of the monitor 31 and an audio amplifier (not shown).

An SI decoder 6 extracts service information (SI) multiplexed on each of physical channels, and demodulates the extracted service information. A remote control light receiver 14 receives signal light from a remote control transmitter (not shown), converts the signal light into an electric signal, and feeds the electric signal to an operation unit 13. The operation unit 13 feeds to the CPU 11 operation information related to various types of keys and operation information from the remote control transmitter.

Connection to a communication line 16 through a communication interface (I/F) 15 makes it possible to make connection to a charging center to send out information related to the history of viewing, for example, and to utilize an interactive data broadcasting service.

Figure 2:
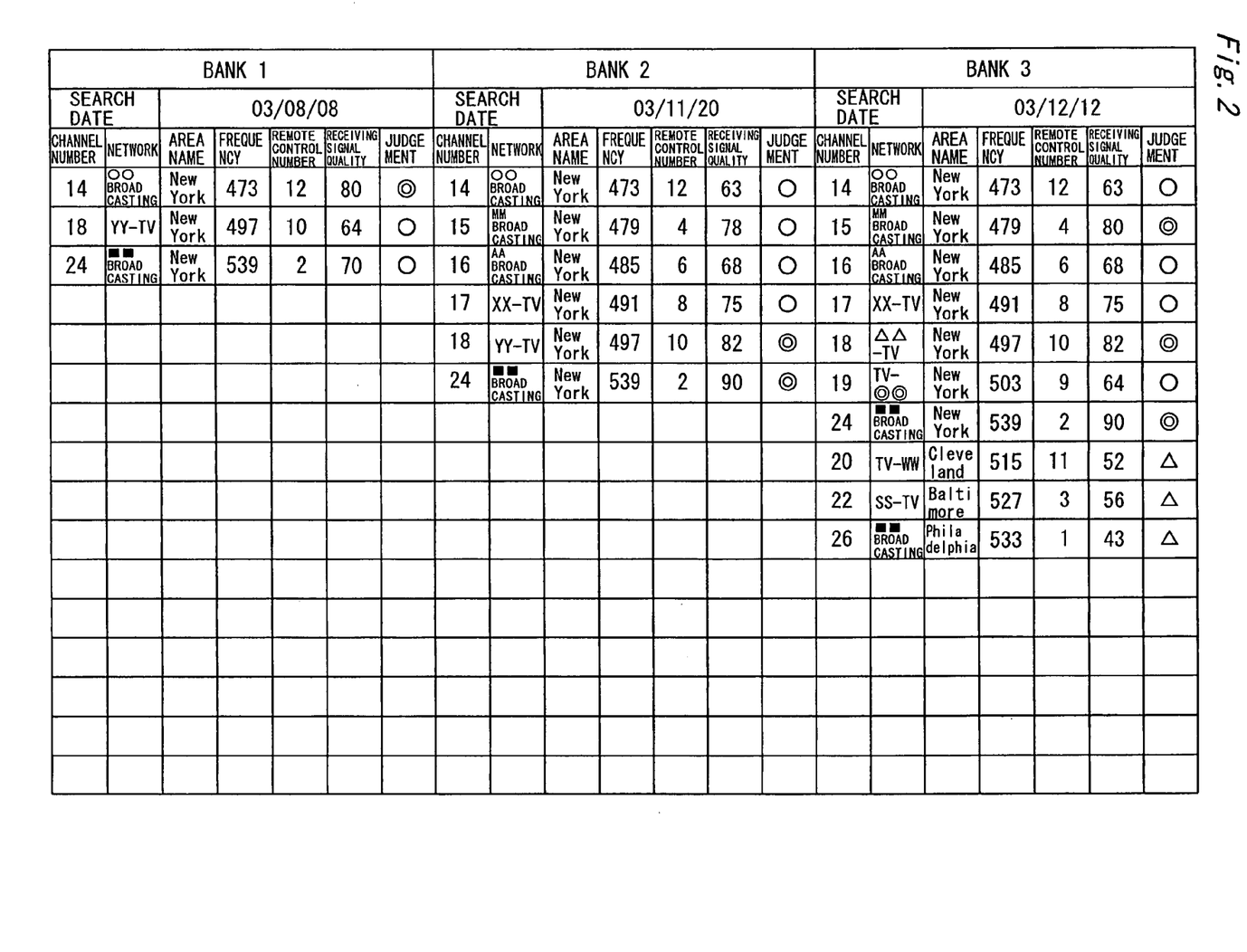
FIG. 2 is an explanatory view illustrating existent station channel information stored in a nonvolatile memory 17.

A memory (a RAM, etc.) 12 stores the results of the newest channel search, for example. A nonvolatile memory (an EEPROM (Electrically Erasable and Programmable ROM), a flash memory, etc.) 17 is provided with three banks for storing registered channel information, as illustrated in FIG. 2. The bank 3 stores the current registered channel information, the bank 2 stores the last registered channel information, and the bank 1 stores the last registered channel information but one.

Each of the banks stores, with respect to each of physical channels, a network name and a broadcasting area name which are obtained from a network ID, a frequency, remote control numbers (keys "1" to "12") in the remote control transmitter which are respectively allocated the physical channels, numerical values representing a bit error rate (BER) or a receiving signal quality calculated from a receiving level, sign codes for representing the receiving signal quality with signs such as ⊚ (good), ○ (normal), Δ (receivable), x (unsuitable), and — (unreceivable), and so on.

Although the CPU 11 carries out overall control in the digital broadcasting receiver 30, it particularly makes a channel search and performs channel registration processing or the like as control according to the present invention.

An initial channel search is automatically made in cases such as a case where the power to the receiver 30 is initially turned on. Further, when it is desired to make a channel search as in a case where the receiver 30 is installed after a user changes his or her residence, for example, the channel search is made by operating the remote control transmitter to select "channel search" out of menu items, for example.

Figure 4:
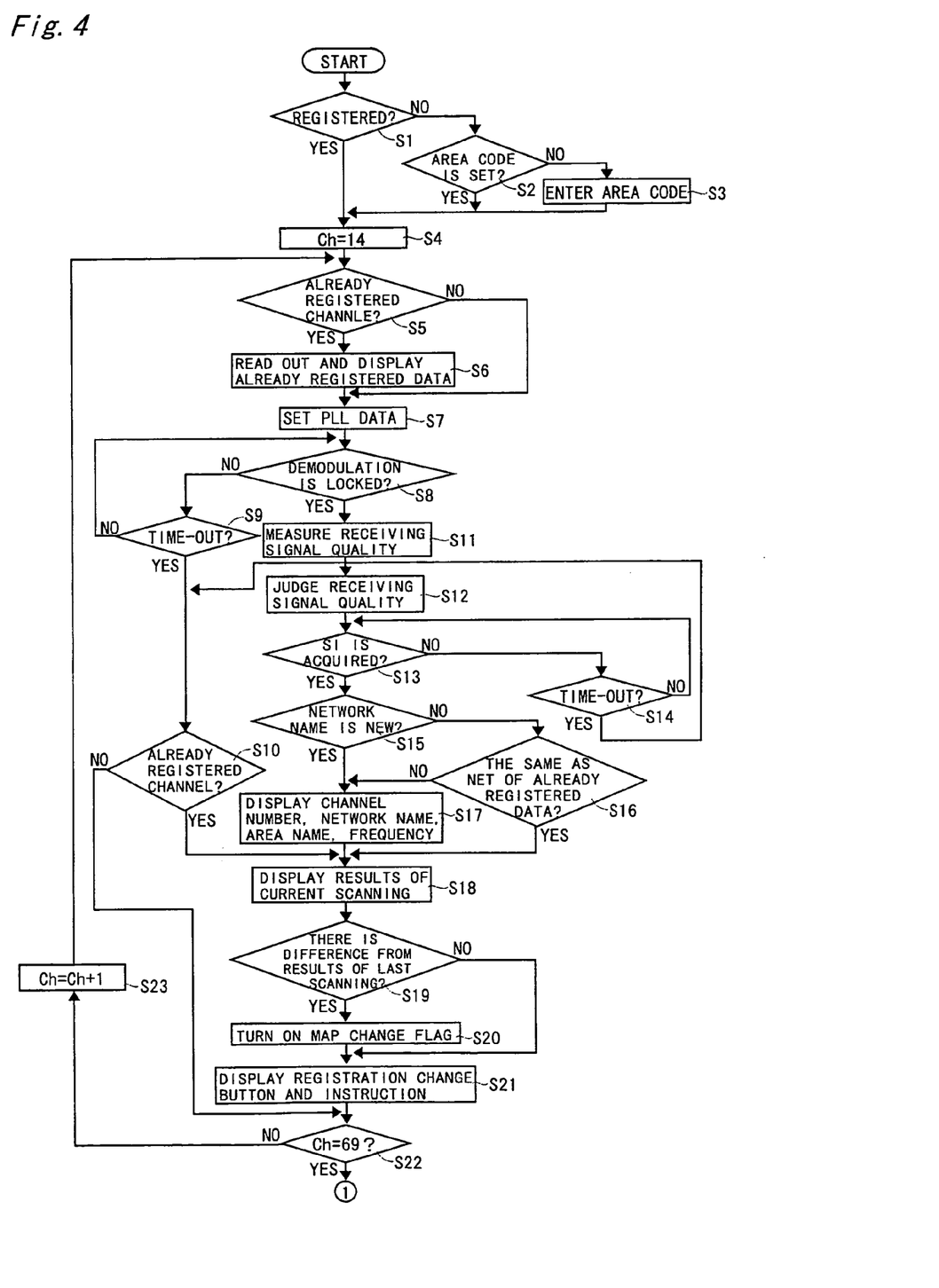
Figure 5:
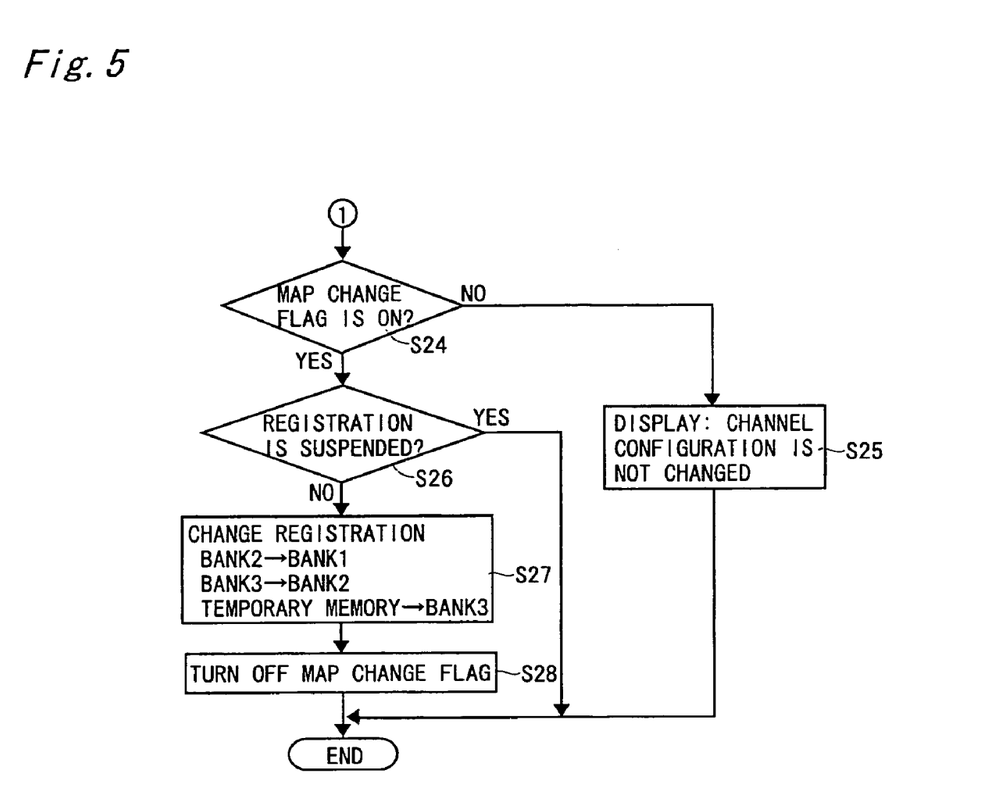

FIGS. 4 and 5 are flow charts for explaining channel search processing, channel registration processing, and so on. When the user selects "channel search" out of the menu items, for example, the CPU 11 judges whether or not registered channel information exists in the nonvolatile memory 17 (step S1), and judges, when the registered channel information does not exist, whether or not an area code which is information related to the place where the receiver 30 is installed is set (step S2). The CPU 11 urges, when the area code is not set, the user to enter an area code (step S3).

The CPU 11 takes Channel 14 which is the lowest frequency in a UHF (Ultrahigh Frequency) band as an object to be judged, for example (step S4), and judges whether or not the channel has already been registered (step S5). If the channel has already been registered, data which has already been registered is read out of the bank 3 in the nonvolatile memory 17, and is displayed as the last scan (already registered) in a channel search confirmation and registration screen (see FIG. 3) (step S6).

Unless the channel has already been registered, the CPU 11 reads out PLL (Phase-Locked Loop) data having a frequency (a received frequency plus an IF) for selecting Channel 14 from a channel number/frequency correspondence table stored in the memory 12 in order to select the channel, and sets the read PLL data in the PLL circuit 2e (step S7). The CPU 11 judges whether or not demodulation can be locked by the tuner 2 (whether or not a broadcasting wave exists) (step S8), judges a time-out previously provided for checking receiving when no broadcasting wave exists (step S9), and judges whether or not the channel has already been registered when a time-out occurs (step S10). The procedure proceeds to the step S18 if the channel has already been registered, while proceeding to the step S22 unless the channel has already been registered. When the CPU 11 judges in the step S8 that a broadcasting wave exists, it measures the signal quality (e.g., an error rate, and a C/N) of a signal obtained by the digital demodulation processing (step S11), and makes judgment for displaying the signal qualities of the signals with signs ⊚, ◯, Δ, and x in descending order of their receiving conditions in order to make the user understandable on the basis of the results of the measurement (step S12). When the broadcasting is not detected (YES in step S9 and YES in step S14), the sign—is displayed.

The CPU 11 judges whether or not service information (SI) related to the channel can be acquired (step S13), judges whether or not a time-out previously provided occurs when the service information cannot be acquired (step S14), and the procedure proceeds to the step S10 when a time-out occurs. The CPU 11 acquires a network name or the like (a network name, a broadcasting area name) from a network ID included in the service information, and judges whether or not the network name or the like is new (step S15). When the network name or the like is not new, it is judged whether or not the network name is the same as the name of the already registered data (step S16), and the procedure proceeds to the step S18 when the network name is the same as the name of the already registered data. In a case where the network name or the like is new (YES in step S15), and a case where the network name is not the same as the name of the already registered data (NO in step S16), a channel number, a network name, an area name, a frequency, etc. are added and displayed on a table of the channel search confirmation/registration screen (step S17).

The CPU 11 displays the results of current scanning in the table of the channel search confirmation/registration screen (step S18) The CPU 11 compares the results of last scanning with the results of current scanning, and judges whether or not there is a difference therebetween (also including the results of the judgment) (step S19). When there is a difference, a flag signifying that channel information is changed is turned on (step S20).

Figure 3:
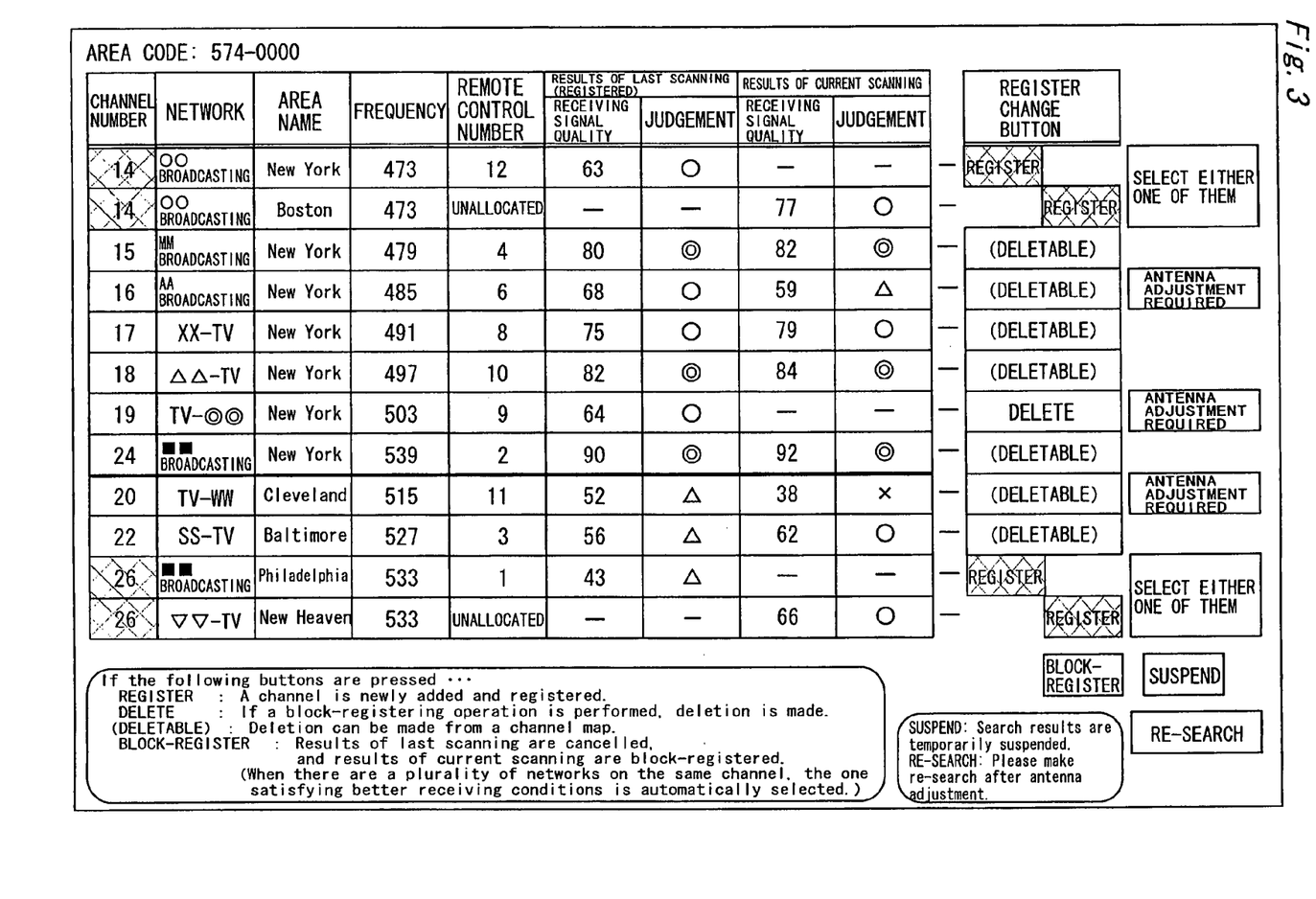
FIG. 3 is an explanatory view illustrating a channel search confirmation/registration screen.

The CPU 11 displays a registration change button and a message (an instruction) on the channel search confirmation/registration screen (see FIG. 3) (step S21). The CPU 11 judges whether or not the channel is the final channel (step S22), and raises the channel number by one unless the channel is the final channel (step S23), to perform the same processing with respect to the channel. The CPU 11 judges whether or not a map change flag is on, as shown in FIG. 5, if the channel is the final channel (step S24). When the map change flag is off, the CPU 11 displays on the screen a message stating "channel configuration is not changed" because the contents of the registration are not changed (step S25), to terminate the processing. On the other hand, when the map change flag is on, the CPU 11 judges whether or not a registering operation is suspended (whether or not a "suspend" button shown in FIG. 3 is operated) (step S26). When the registration is suspended (when the user desires to perform a registering operation later because he or she desires to watch TV now), the processing is terminated with the map change flag remaining on (the transition to a normal state where received broadcasting is displayed occurs). When a television is turned off (in a stand-by state) and the television is turned on again, the processing may be performed on the basis of the contents of the map change flag in this case (see FIG. 6, described later). When the registration is not suspended (block registration, individual registration), the contents of the registration are reflected on the results of current scanning in the memory 12. Data in the bank 2 in the nonvolatile memory 17 is transferred to the bank 1, data in the bank 3 is transferred to the bank 2, and the contents of the registration held on the memory 12 (the contents of the registration reflected on the results of current scanning) are transferred to the bank 3 (step S27). The map change flag is turned off (step S28), to terminate the processing.

In the channel search confirmation/registration screen shown in FIG. 3, information "channel number 14, ◯◯ broadcasting station, New York . . . " is displayed on the first line, which shows a case where there are results of last scanning and there are no results of current scanning. Further, information "channel number 14, ◯◯ broadcasting station, Boston . . . " is displayed on the second line, which shows a case where there are no results of last scanning and there are results of current scanning. This supposes a case where broadcasting in a ◯◯ broadcasting station from New York can be received on Channel 14 last time, while the broadcasting cannot be received and broadcasting in a ◯◯ broadcasting station from Boston can be received on Channel 14 this time. In such a case, the answer is in the affirmative in the step S5, is in the negative in the step S15, and is in the negative in the step S16 in the processing on Channel 14 in FIG. 4, so that two channels 14 are respectively displayed on the first line and the second line.

A "register" button is displayed in correspondence with the first line and the second line below an indication "registration change button". The "register" button is displayed as a form divided at the center (a left button and a right button), and indicates in an easily understood manner that the left button is for selecting the results of last scanning and the right button is for selecting the results of current scanning. Further, an instruction "select either one of them" is displayed beside the "register" button. The user may see the results of the channel search, to put the cursor on the "register" button at the right corresponding to "Boston" (change the color thereof) if he or she desires to perform channel registration with respect to Channel 14 in "Boston", and press an enter button.

A "(deletable)" button, a "delete" button, a "block-register" button, and a "suspend" button are displayed in addition to the above-mentioned "register" button below the indication "registration change button". Further, a "re-search" button is also provided at the lower right position of the screen. The description of each of the buttons is displayed on the screen to make the user easy to understand.

The user may operate the "block-register" button if he or she desires to employ the results of current searching as it is. In the case of the block registration, a channel on which the "delete" button is shown is automatically deleted. Further, in a case where a plurality of broadcasting having different network IDs are detected on the same physical channel in the results of last scanning and the results of current scanning (see Channel 14 in FIG. 3), when the above-mentioned "block-register" button is operated, the channel having the network ID corresponding an area code set by the user, for example, may be automatically registered, or a network of the best receiving signal quality may be automatically registered (an example of Channel 26).

In a case where a channel search is accidentally made while waves are stopped, it is judged that there is no broadcasting wave with respect to a channel on which waves are stopped. If the user judges "the results of the search are ones during the stop of waves" by seeing the results, the results of last scanning can be employed by operating the left "register" button with respect to the channel. That is, the user can individually judge the validity of the results of scanning to individually register the results of scanning.

Further, the user may operate the above-mentioned "suspend" button when the user desires to perform a registering operation later because he or she desires to watch TV now.

When the results of the judgment of the receiving quality are ∆, x, or –, a message "antenna adjustment required" is displayed beside a line on which the channel is displayed. Even when the receiving signal quality at the time of current scanning is degraded by not less than a predetermined level than that at the time of last scanning, "antenna adjustment required" may be displayed. The user can make the channel search again by pressing the "re-search" button after the antenna is adjusted, for example. The "re-search" button may not be displayed when the "antenna adjustment required" is not displayed.

When the above-mentioned "(deletable)" button is operated, the registration of the corresponding channel is canceled. If such setting that the deletion is reflected on a list of channel up/down keys is employed, the deleted channel can be skipped in changing the channels by the channel up/down operation.

It is possible to perform such setting that a channel search is automatically executed during a stand-by state (at the time of non-viewing) of the receiver 30. In a case where the channel search is made during a stand-by state, scanning and service information acquiring are performed with respect to each of the physical channels, as in the above-mentioned channel search made by the user's instruction. In a case where a difference from the results of last scanning is found, processing for turning the map change flag on, for example, is performed. Specifically, the receiver 30 may be automatically returned to the stand-by state after the processing for the final channel (Channel 69) is terminated in a flow chart in FIG. 4. Further, when the answer is in the negative in the step S2, the receiver 30 may be automatically returned to the stand-by state.

Figure 6:
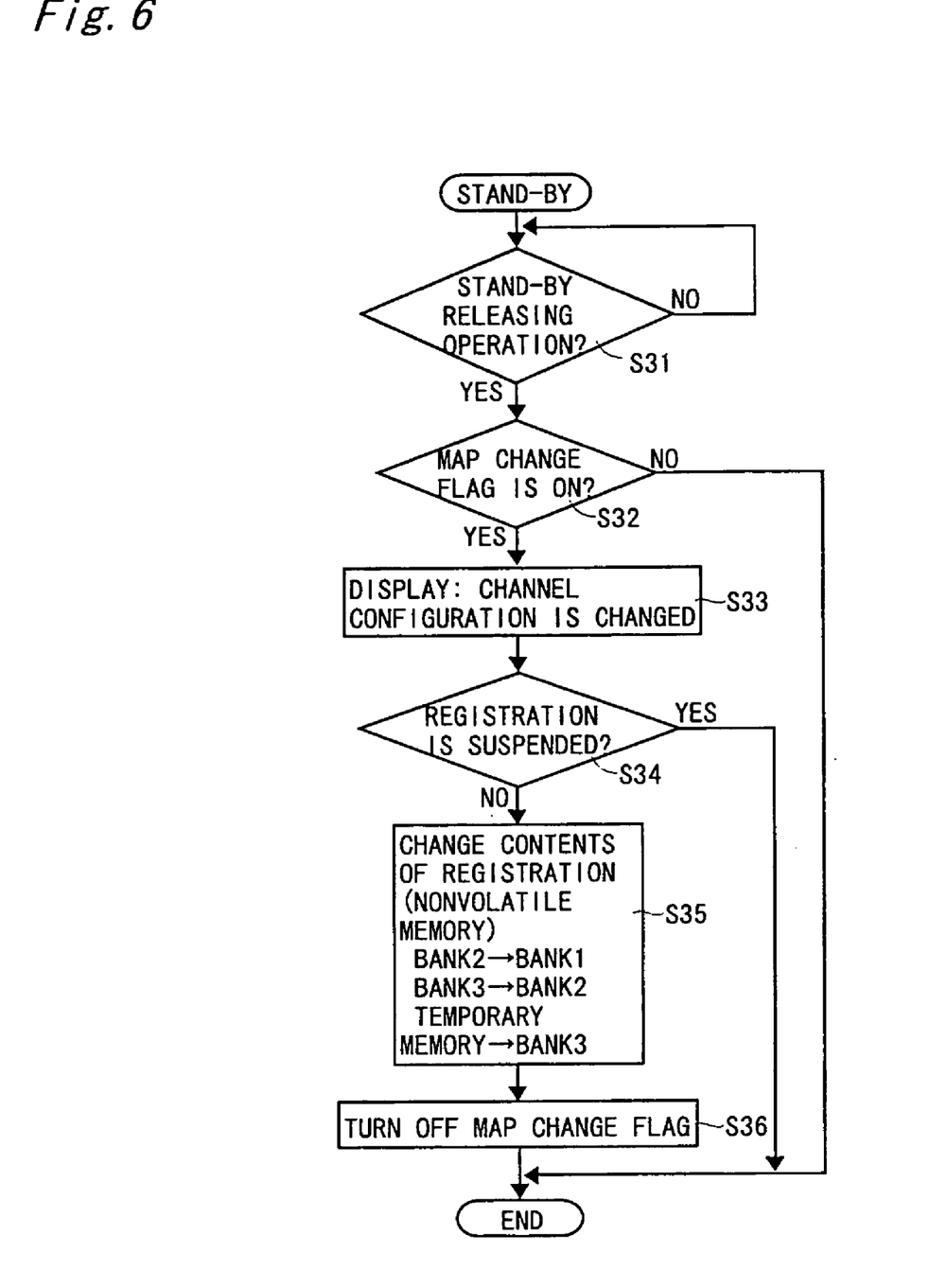
FIG. 6 is a flow chart for explaining existent station channel information updating processing at the time of releasing a stand-by state.

FIG. 6 is a flow chart showing the contents of processing for presenting the results of the search at the time of releasing a stand-by state (at the time of turning TV on). When an operation for releasing a stand-by state is performed (YES in step S31), the CPU 11 judges whether or not the map change flag is on (step S32). If the flag is off, normal program receiving processing is performed. If the flag is on, a message stating "channel configuration is changed" is displayed on the screen, and the "execute registering operation" button and the "suspend" button are displayed, to make the user select either one of the buttons (step S33). When the user selects the suspension (YES in step S34), normal processing for displaying received broadcasting is performed.

When the "execute registering operation" button is operated (NO in step S34), the search result screen as shown in FIG. 3 is displayed. The contents of the registration are reflected on the results of current scanning in the memory 12 on the basis of a registering operation (block registration, individual registration) on the screen. Data in the bank 2 in the nonvolatile memory 17 is transferred to the bank 1, data in the bank 3 is transferred to the bank 2, and the contents of the registration held on the memory 12 (one obtained by reflecting the contents of the registration on the results of current scanning) are transferred to the bank 3 (step S35). The map change flag is turned off (step S36), to terminate the processing.

It may be assumed that a new channel search is not automatically executed until the registering operation is completed. Buttons such as an "employ results of last scanning" button and an "employ results of last scanning but one" button (not shown) may be provided on the channel search confirmation/registration screen, and such setting that channel selection processing can be performed using the contents of the past channel information stored in the bank 1 and the bank 2 may be provided. When an area code of the receiver 30 is changed by the user due to a change of his or her residence, the past existent station channel information stored in the bank may be deleted.

When the receiving signal quality of the channel selected by the user (the channel during viewing) is monitored, and the degradation thereof is more significant, as compared with the receiving signal quality on the channel stored in the bank 3, a message stating "receiving signal quality is being degraded", for example, is displayed to call attention to the user, it is possible to avoid situations where broadcasting cannot be suddenly received without warning.

As described in the foregoing, according to the present invention, it is possible to change the contents of the registration of current channel information by the user operation on the screen of the channel information between which the difference between the results of last scanning and the results of current scanning is presented on the basis of new channel information. Accordingly, the new channel information can be registered by reflecting a user's judgment (judgment as to the validity of change) and a user's desire.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
    means for storing, when there is a difference between current channel information and new channel information obtained by a new channel search, the new channel information while holding a state where the current channel information is registered;
    means for displaying on a screen said channel information between which the difference is presented; and
    means for allowing the contents of the registration of the current channel information to be changed on the basis of the new channel information by a user operation on said screen, wherein
    the registration of the channel information is changed for each channel by the user operation, wherein
    the registration of the channel information is changed for each channel by the user operation, wherein
    in a case where network IDs which are on the same physical channel and differ from one another in the current contents of the registration are detected by the channel search, the channel information for each of the network IDs is presented, and either one of the channel information is registered on the basis of a user's instruction.

2. The digital broadcasting receiver according to claim 1, wherein
block registration based on new existent station channel information is performed by the user operation.

3. A digital broadcasting receiver comprising:
means for storing, when there is a difference between current channel information and new channel information obtained by a new channel search, the new channel information while holding a state where the current channel information is registered;
means for displaying on a screen said channel information between which the difference is presented; and
means for allowing the contents of the registration of the current channel information to be changed on the basis of the new channel information by a user operation on said screen, wherein block registration based on new existent station channel information is performed by the user operation, wherein
in a case where a plurality of network IDs which are on the same channel and differ from one another are detected by a channel search, a network of the best receiving quality out of the network IDs is automatically registered in said block registration.

4. A digital broadcasting receiver comprising:
means for storing, when there is a difference between current channel information and new channel information obtained by a new channel search, the new channel information while holding a state where the current channel information is registered;
means for displaying on a screen said channel information between which the difference is presented; and
means for allowing the contents of the registration of the current channel information to be changed on the basis of the new channel information by a user operation on said screen, wherein
block registration based on new existent station channel information is performed by the user operation, wherein
in a case where a plurality of network IDs which are on the same channel and differ from one another are detected by a channel search, the channels having the network IDs directed to the same area as an area where the receiver is installed are automatically registered in said block registration.

5. The digital broadcasting receiver according to claim 1, wherein
display for urging, when there is a difference between new channel information obtained by a channel search at the time of a stand-by state and current channel information, a registering operation to be performed by screen display at the time of releasing the stand-by state.

6. The digital broadcasting receiver according to claim 1, wherein
in a case where an instruction signifying that no registering operation is performed is issued, display for urging a registering operation to be performed by screen display at the next time of releasing the stand-by state.

7. The digital broadcasting receiver according to either one of claims 5 and 6, wherein
the execution of re-search for a channel is suspended while no registering operation is performed.

8. The digital broadcasting receiver according to claim 1, wherein
information related to the receiving signal quality is held in correspondence with each of the channel information, and
display for indicating the receiving signal quality is performed, when the channel information between which the difference is presented are displayed on the screen, in correspondence with the corresponding channel.

9. A digital broadcasting receiver comprising:
means for storing, when there is a difference between current channel information and new channel information obtained by a new channel search, the new channel information while holding a state where the current channel information is registered;
means for displaying on a screen said channel information between which the difference is presented; and
means for allowing the contents of the registration of the current channel information to be changed on the basis of the new channel information by a user operation on said screen, wherein
information related to the receiving signal quality is held in correspondence with each of the channel information, and
display for urging an antenna to be adjusted is performed on a screen on which the channel information between which the difference is presented is displayed in correspondence with the corresponding channel when said receiving signal quality is close to its receiving limit.

10. A digital broadcasting receiver comprising:
means for storing, when there is a difference between current channel information and new channel information obtained by a new channel search, the new channel information while holding a state where the current channel information is registered;
means for displaying on a screen said channel information between which the difference is presented; and
means for allowing the contents of the registration of the current channel information to be changed on the basis of the new channel information by a user operation on said screen, wherein
the registered channel information is erased when a code indicating the area where the receiver is installed is set again.

11. The digital broadcasting receiver according to claim 1, further comprising
means for storing the past registered channel information, and
means for selecting the past registered channel information in place of the current registered channel information by the user operation.

* * * * *